(12) United States Patent
Park et al.

(10) Patent No.: US 8,045,070 B2
(45) Date of Patent: Oct. 25, 2011

(54) ELECTRONIC DISPLAY DEVICE

(75) Inventors: Chan-Young Park, Yongin-si (KR); Beom-Shik Kim, Yongin-si (KR); Hui Nam, Yongin-si (KR); Ja-Seung Ku, Yongin-si (KR)

(73) Assignee: Samsung Mobile Display Co., Ltd., Yongin (KR)

(*) Notice: Subject to any disclaimer, the term of this patent is extended or adjusted under 35 U.S.C. 154(b) by 437 days.

(21) Appl. No.: 12/124,246

(22) Filed: May 21, 2008

(65) Prior Publication Data
US 2009/0051835 A1 Feb. 26, 2009

(30) Foreign Application Priority Data
Aug. 24, 2007 (KR) .................. 10-2007-0085578

(51) Int. Cl.
G02F 1/1335 (2006.01)
G02F 1/1347 (2006.01)
G02F 1/1333 (2006.01)
G02F 1/1343 (2006.01)

(52) U.S. Cl. ............. 349/15; 349/74; 349/110; 349/141

(58) Field of Classification Search .................... 349/15, 349/193, 74, 110, 141, 201
See application file for complete search history.

(56) References Cited

U.S. PATENT DOCUMENTS
| | | | |
|---|---|---|---|
| 5,315,377 A | 5/1994 | Isono et al. | |
| 7,327,410 B2 * | 2/2008 | Cho et al. | 349/15 |
| 7,733,296 B2 * | 6/2010 | Lee et al. | 345/6 |

FOREIGN PATENT DOCUMENTS
| | | |
|---|---|---|
| KR | 10-0274625 B1 | 9/2000 |
| KR | 10-2006-0096844 | 9/2006 |
| KR | 10-2007-0026997 | 3/2007 |
| KR | 10-2007-0048355 | 5/2007 |
| KR | 10-2007-0056643 | 6/2007 |

* cited by examiner

Primary Examiner — Dung T. Nguyen
(74) Attorney, Agent, or Firm — Christie, Parker & Hale, LLP

(57) ABSTRACT

An electronic display device using a barrier includes a display unit displaying an image corresponding to a two dimension (2D) or a three dimension (3D), and a barrier facing the display unit and providing a 2D image or 3D image to a user. The barrier includes first and second substrates facing each other. First and second electrodes are alternately formed on the first substrate and having first gaps therebetween. A third electrode is formed on the second substrate. A dark colored layer is formed to correspond to the first gap. A liquid crystal layer is disposed between the first and second substrates.

11 Claims, 6 Drawing Sheets

ELECTRONIC DISPLAY DEVICE

CROSS-REFERENCE TO RELATED APPLICATION

This application claims priority to and the benefit of Korean Patent Application No. 10-2007-0085578 filed in the Korean Intellectual Property Office on Aug. 24, 2007, the entire content of which is incorporated herein by reference.

BACKGROUND OF THE INVENTION

1. Field of the Invention

The present invention relates to electronic display devices, and, more particularly, to an autostereoscopic electronic display device using a barrier.

2. Description of the Related Art

In electronic displays, a stereoscopic device can provide different images to left and right eyes of a user so that the user can perceive distance and have a stereoscopic sense of the image. An autostereoscopic electronic display is configured to provide a stereoscopic image to a user even when the user does not use an instrument such as polarizing spectacles.

The conventional autostereoscopic electronic display employs a method for space-dividing an image displayed on an image display unit by providing a parallax barrier, a lenticular lens, or a micro-lens array, for example, on the front surface of the image display unit.

The parallax barrier may be formed in a liquid crystal shutter using technologies such as a transmissive type of liquid crystal display. In this case, a mode conversion between a two-dimensional (2D) image mode and a three-dimensional (3D) mode (stereoscopic image mode) becomes possible. As such, the parallax barrier can be effectively applied to a laptop computer or a mobile phone.

Generally, the parallax barrier includes light blocking portions arranged in a stripe pattern and light transmitting portions arranged in a stripe pattern. Therefore, a right eye image realized by right eye sub-pixels reaches the right eye of the user through the light transmitting portions of the parallax barrier, and a left eye image realized by left eye sub-pixels reaches the left eye of the user through the light transmitting portions of the parallax barrier. Accordingly, the user can perceive the image displayed on the image display unit as a stereoscopic image.

However, since the electronic display having the parallax barrier is designed to divide the image into the right and left eye images to display the 3D image, the resolution of the 3D image is reduced to be half the resolution of the 2D image.

To solve this problem, a time-division driving type of electronic display has been developed. The time-division driving type electronic display alternately displays the left and right eye images on the display unit at a predetermined time intervals. In order to realize this, the parallax barrier forms the light blocking portions and the light transmitting portions such that patterns of the light blocking portions and light transmitting portions change with each other. By employing this time-division driving method instead of the space-division driving method, the electronic image display can display the 3D image with resolution that is not deteriorated.

In the time-division driving method, the parallax barrier is required to operate to quickly change patterns of the light blocking portion and the light transmitting portion. Generally, electrodes forming the parallax barrier are alternately arranged to form the light blocking portion and the light transmitting portion. Minute gaps are formed between the arranged electrodes, and therefore light leaks from the gaps. Since the light causes an increase of crosstalk of a 3D image, quality and contrast of the screen are deteriorated.

SUMMARY OF THE INVENTION

In accordance with present invention an electronic display device is provided for realizing a high quality stereoscopic image having high resolution by using a parallax barrier.

According to an exemplary embodiment of the present invention, an electronic display device includes a display unit and a barrier. The display unit displays an image corresponding to a 2D or a 3D. The barrier faces the display unit and provides a 2D image or 3D image to a user. The barrier includes first and second substrates facing each other. First and second electrodes are alternately formed on the first substrate while having first gaps therebetween. A third electrode is formed on the second substrate. A dark colored layer is formed to correspond to the first gap. A liquid crystal layer is disposed between the first and second substrates.

The barrier includes a first alignment layer formed on the first substrate while covering the first and second electrodes, and a second alignment layer formed on the second substrate while covering the third electrode. The dark colored layer is formed on at least one of the first alignment layer and the second alignment layer.

The plurality of first electrodes and the plurality of second electrodes are provided in the electron display device. The barrier further includes a first connection electrode for electrically connecting the first electrodes and a second connection electrode for electrically connecting the second electrodes. The dark colored layer is formed to correspond to second gaps formed between the first connection electrode and the second electrodes and between the second connection electrode and the first electrodes.

The first electrodes and the second electrodes are formed of a transparent material, and the third electrodes may be integrally formed on the front surface of the second substrate.

The barrier is a normally white mode liquid crystal display. In the display unit, a first pixel and a second pixel corresponding to a pattern of the first and second electrodes are alternately and repeatedly arranged along an arrangement direction of the first electrode. A liquid crystal driving voltage is applied to the first electrode. A left-eye image is displayed on the first pixel and a right-eye image is displayed on the second pixel during a first period. The liquid crystal driving voltage is applied to the second electrode. The right-eye image is displayed on the first pixel, and the left-eye image is displayed on the second pixel during a second period. The left-eye image and the right-eye image are realized in a time-division method. The barrier is in an off-state when the display unit displays a 2D image.

DETAILED DESCRIPTION OF THE EMBODIMENTS

Figure 1:
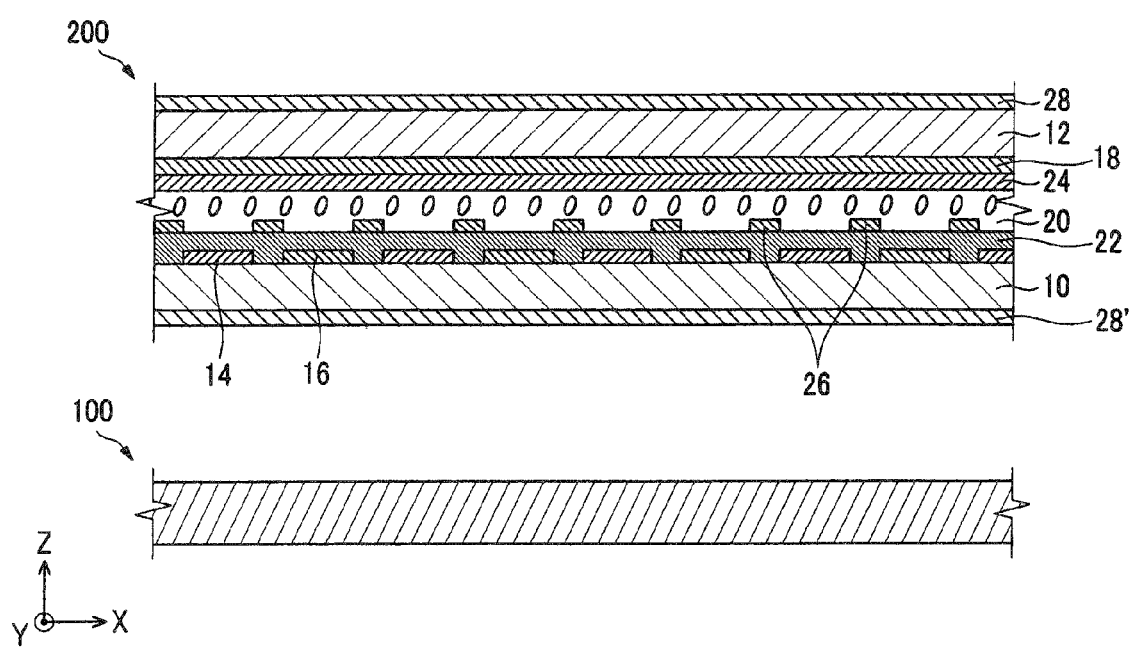
FIG. 1 is a cross-sectional view of an electronic display according to a first exemplary embodiment of the present invention.

Referring to FIG. 1, an electronic display of an exemplary embodiment of the present invention includes a display unit 100 and a barrier 200.

The display unit 100 displays right and left eye images each having a predetermined pattern. In this case, the patterns of the left and right eye images can be realized by first and second images that are alternately displayed with a predetermined image frequency.

Any display device may be used as the display unit 100. For example, the display unit 100 may be one of a cathode ray tube (CRT), a liquid crystal display (LCD), a plasma display panel (PDP), a field emission display (FED), and an organic light emitting display (OLED).

The barrier 200 may be formed of a normally white mode LCD that transmits light in an off-state and blocks the light in an on-state.

In more detail, the barrier 200 includes first and second substrates 10, 12, a plurality of first electrodes 14, a plurality of second electrodes 16, a third electrode 18, and a liquid crystal layer 20. Further, the barrier 200 includes a first alignment layer 22 and a second alignment layer 24.

The first and second substrates 10, 12 face each other with a predetermined interval therebetween. Each of the first and second substrates 10, 20 is formed of a rectangular glass plate having a pair of short sides and a pair of long sides.

The first electrodes 14 and the second electrodes 16 are formed on one surface of the first substrate 10 toward the second substrate 12. The third electrode 18 is formed on one surface of the second substrate 12 toward the first substrate 10. The third electrode 18 may be integrally formed on the surface of the second substrate 12, or a plurality of third electrodes 18 may be formed such that the first and second electrodes cross the third electrodes. The electrodes 14, 16, 18 may be formed of a transparent material such as indium tin oxide (ITO) or indium zinc oxide (IZO).

The first alignment layer 22 is formed on the first substrate 10 while covering the first electrodes 14 and the second electrodes 16. The second alignment layer 24 is formed on the second substrate 12 while covering the third electrode 18. The first alignment layer 22 and the second alignment layer 24 align liquid crystal molecules of the liquid crystal layer 20 in a predetermined direction.

In addition, a dark colored layer 26, which is referred to as a black matrix, is formed between the first electrodes 14 and the second electrodes 16.

Figure 2A:
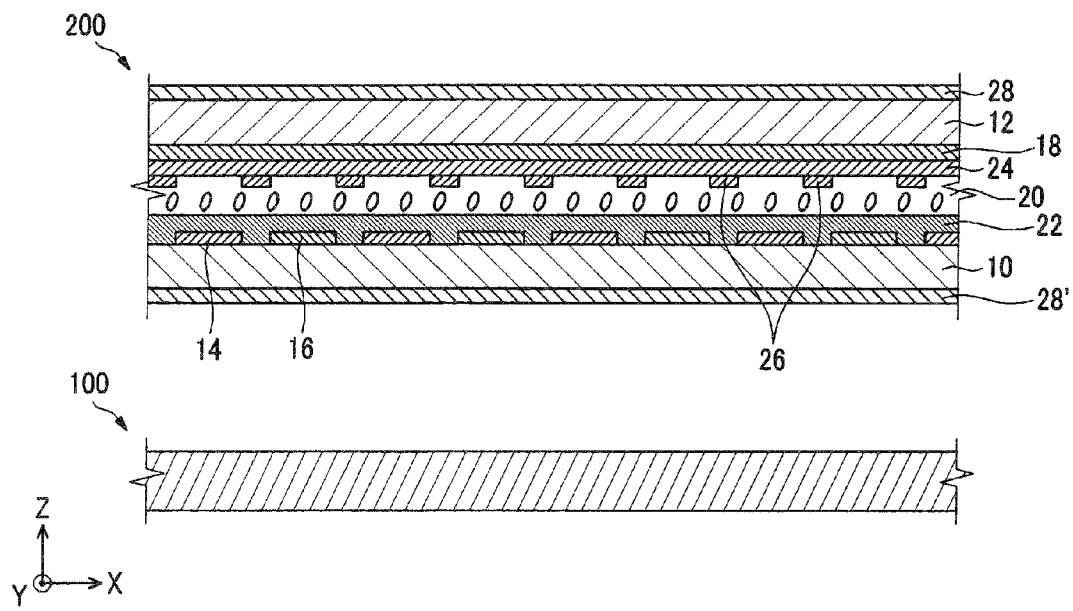
FIG. 2A and FIG. 2B are cross-sectional views representing electronic display devices according to exemplary variations of the exemplary embodiment of the present invention.
Figure 2B:
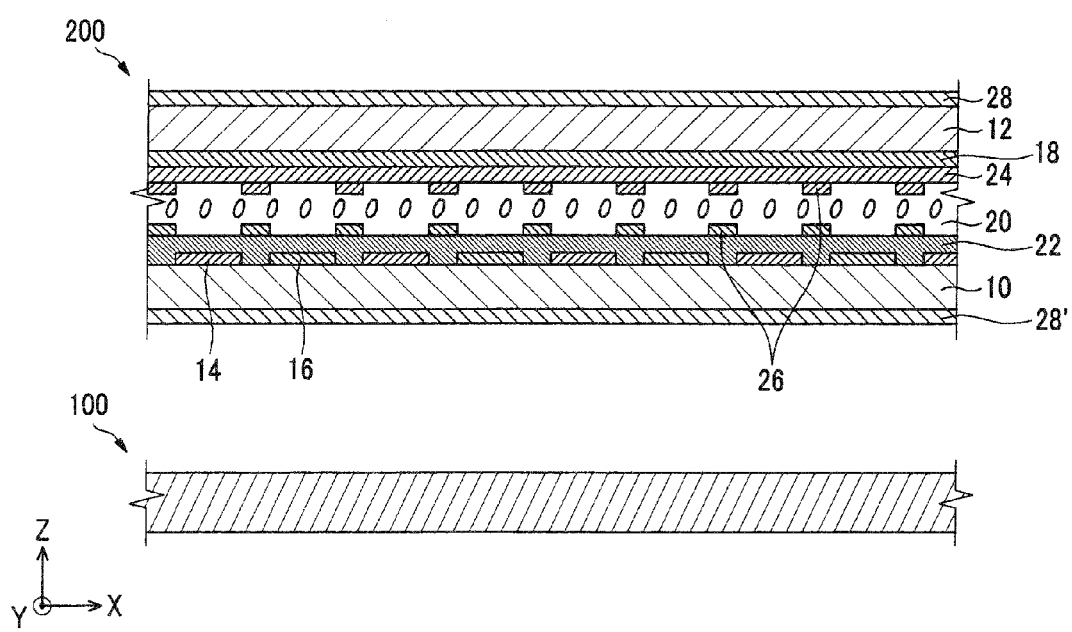

While the dark colored layer 26 is illustrated to be formed on the first alignment layer 22 in FIG. 1, the dark colored layer 26 may be formed on the second alignment layer 24 (refer to FIG. 2A), or it may be formed on the first alignment layer 22 and the second alignment layer 24 (refer to FIG. 2B).

A pair of polarizing plates 28, 28' are disposed on respective outside surfaces of the first substrate 10 and the second substrate 12. A configuration of the first electrodes 14, the second electrodes 16, and the dark colored layer 26 will now be described.

Figure 3:
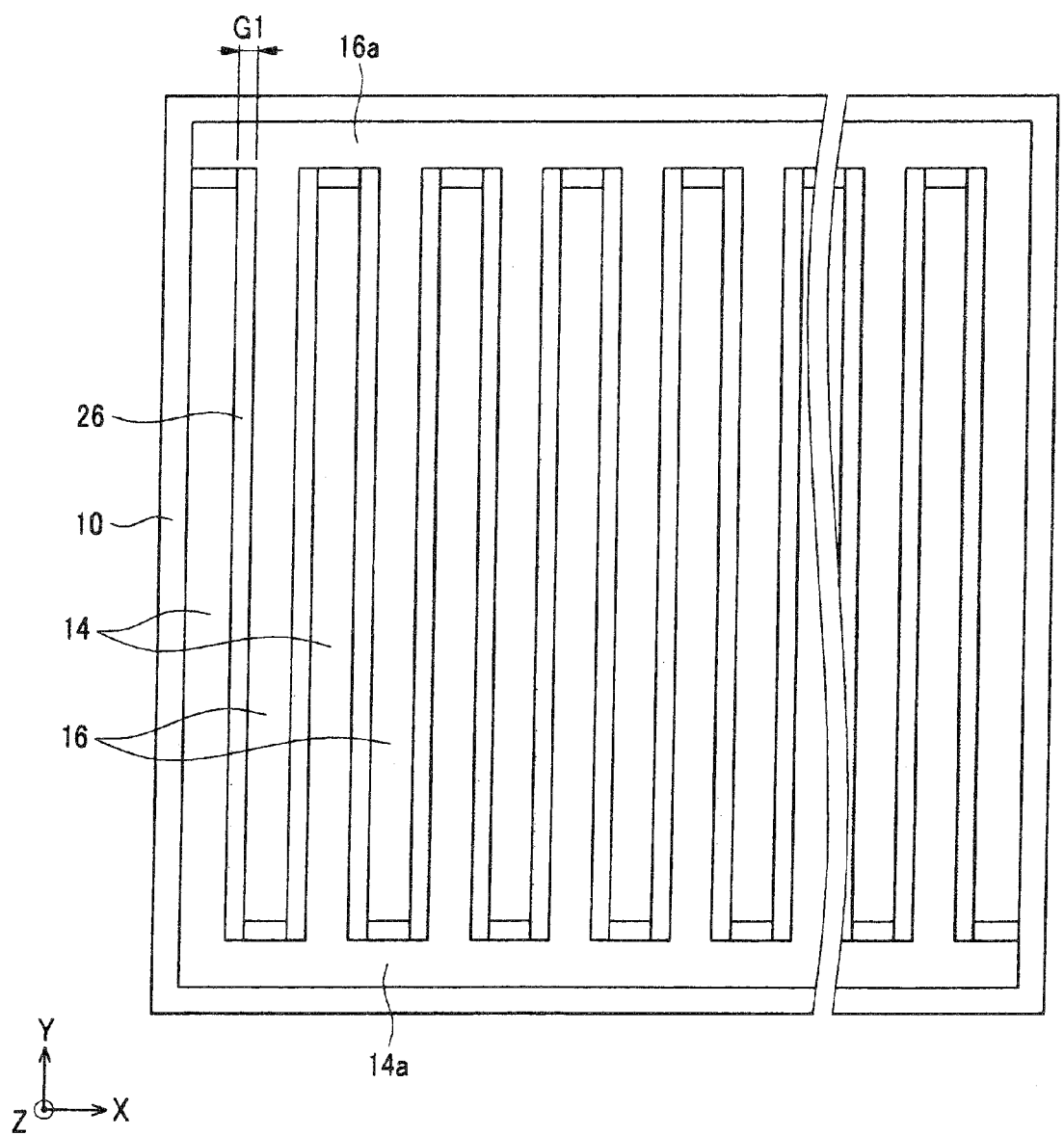
FIG. 3 is a diagram representing a first electrode, a second electrode, and a dark colored layer that are formed on a first substrate in the barrier shown in FIG. 1.

FIG. 3 is a diagram representing the first electrodes 14, the second electrodes 16, and the dark colored layer 26 that are formed on the first substrate 10 in the barrier 200 shown in FIG. 1. For better understanding and ease of description, the first alignment layer shown in FIG. 1 is omitted in FIG. 3.

Referring to FIG. 3, the first electrodes 14 formed on the first substrate 10 are extended along a first direction (e.g., the Y-axis direction in the drawings) of the first substrate 10. The first electrodes 14 are formed on the first substrate 10 in a stripe pattern while having predetermined intervals therebetween. On the first substrate 10, a first connection electrode 14a electrically connecting the first electrodes 14 is formed along a second direction (e.g., the X-axis direction in the drawings) of the first substrate, and is connected to each terminal of the first electrodes 14.

The second electrodes 16 are also extended in the first direction. The second electrodes 16 are respectively formed between the first electrodes 14 in a stripe pattern. In addition, on the first substrate 10, a second connection electrode 16a for electrically connecting the second electrodes 16 is formed in the second direction, and is connected to each terminal of the second electrodes 16.

Therefore, the first and second electrodes 14, 16 are alternately formed along the second direction, and a first gap G1 of a predetermined width is formed between the first electrodes 14 and the second electrodes 16. In addition, the dark colored layer 26 is formed to correspond to the first gap G1.

In the exemplary embodiment of the present embodiment, the dark colored layer 26 corresponding to the first gap G1 is formed on the first alignment layer 22 in the stripe pattern in the first direction to cover the first gap G1. Accordingly, the dark colored layer 26 has a width that is substantially the same as the width of the first gap G1, which may be approximately 1 to 20 µm. In FIG. 3, it can be seen that the dark colored layer 26 has the same width as the first gap G1.

Figure 4A:
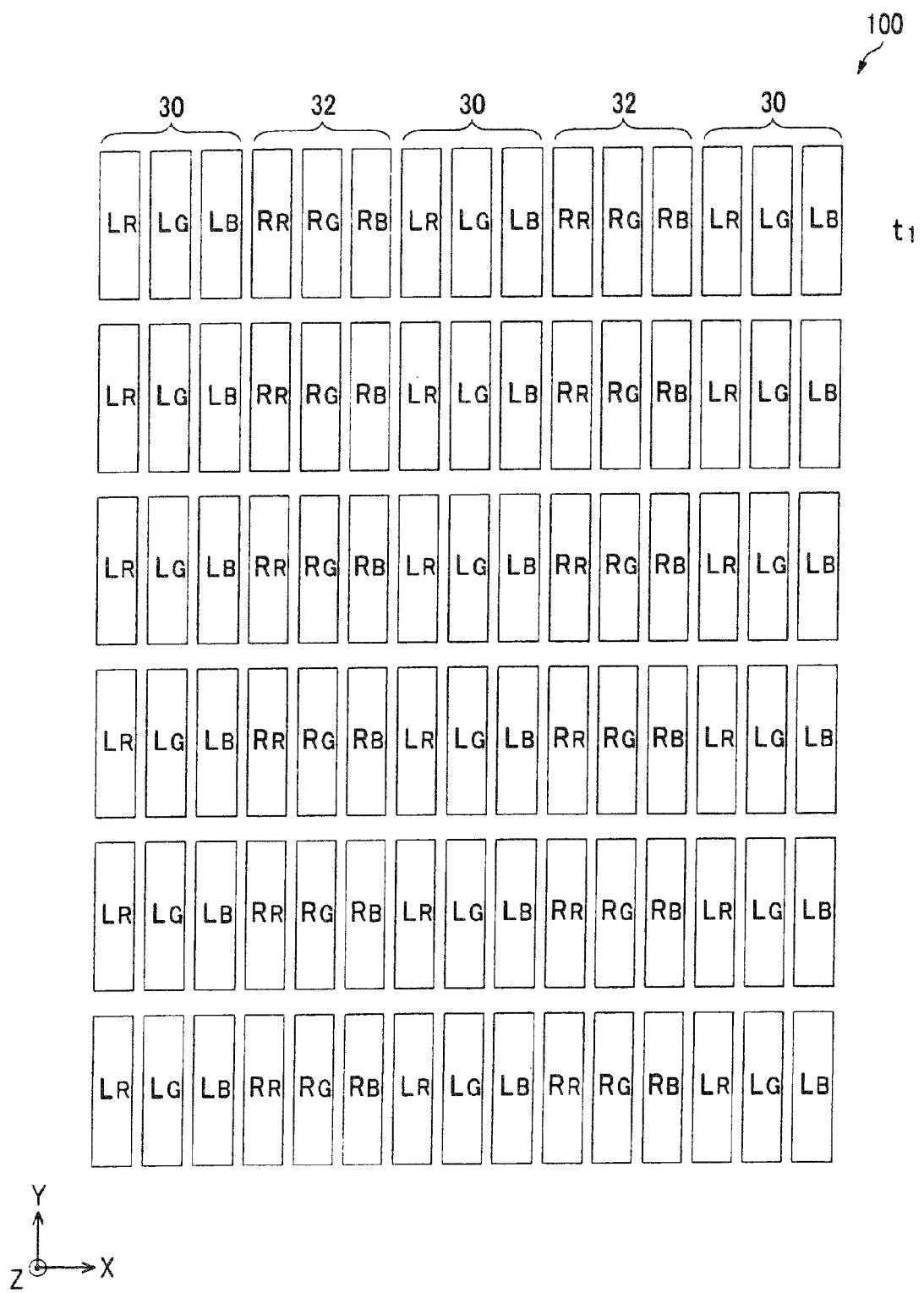
FIG. 4A shows a pixel arrangement of the display unit during a first period $t_1$.
Figure 4B:
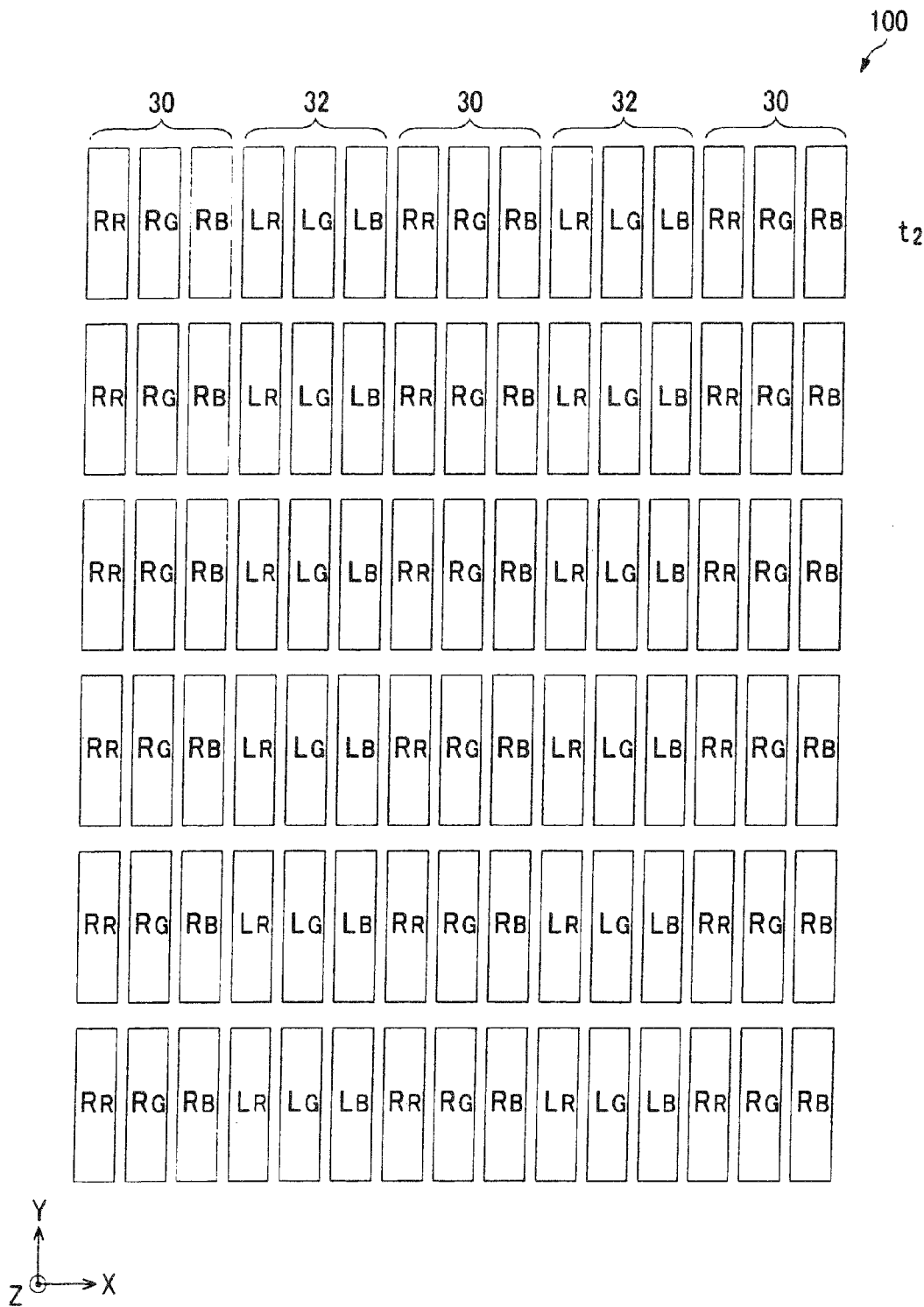
FIG. 4B shows a pixel arrangement of the display unit during a second period $t_2$.

A pixel arrangement and an operation of the display unit 100 will now be described. FIG. 4A and FIG. 4B respectively show pixel arrangements of the display unit 100 during first and second periods $t_1$, $t_2$. The display unit 100 includes first pixel groups 30 and second pixel groups 32 that extend in the first direction (e.g. the Y-axis direction). The first pixel groups 30 and the second pixel groups 32 are alternately disposed along the second direction.

As shown in FIG. 4A, during the first period $t_1$, the first pixel group 30 displays a left-eye image ($L_R$, $L_G$, $L_B$) in response to a left-eye image signal, and the second pixel group 32 displays a right-eye image ($R_R$, $R_G$, $R_B$) in response to a right-eye image signal. Accordingly, a first image is displayed in the display unit 100 during the first period $t_1$.

In addition, during the first period $t_1$ for displaying the first image in the display unit 100, a liquid crystal driving voltage is applied to the first electrode 14 through the first connection electrode 14a, and a reference voltage (e.g., a ground voltage) is applied to the second electrode 16 through the second connection electrode 16a. Further, the reference voltage is applied to the third electrode 18. Here, the first electrode 14 and the dark colored layer 26 are formed to be the light blocking portion, and the second electrode 16 is formed to be the light transmitting portion.

As shown in FIG. 4B, during the second period $t_2$, as opposed to the first period, the first pixel group 30 displays the right-eye image ($R_R$, $R_G$, $R_B$) in response to the right-eye image signal, and the second pixel group 32 displays the left-eye image ($L_R$, $L_G$, $L_B$) in response to the left-eye image signal. Accordingly, a second image is displayed in the display unit 100 during the second period $t_2$.

During the second period $t_2$ for displaying the second image in the display unit 100, the reference voltage is applied to the first electrode 14 through the first connection electrode 14a, and the liquid crystal driving voltage is applied to the second electrode 16 through the second connection electrode 16a. In addition, the reference voltage is applied to the third electrode 18. Here, the first electrode 14 is formed to be the light transmitting portion, and the second electrode 16 and the dark colored layer 26 are formed to be the light blocking portion.

By driving the display unit 100 and the barrier 200 as described above, the left eye of a user sees an image realized through the first pixel group 30 during the first period $t_1$, and an image realized through the second pixel group 32 during the second period $t_2$. In addition, the right eye of the user sees an image realized through the second pixel group 32 during the first period $t_1$, and an image realized through the first pixel group 30 during the second period $t_2$. Accordingly, since the user observes a stereoscopic image in a time-division method rather than a space-division method, the user may see the stereoscopic image having a resolution that is substantially the same as that of a 2D image.

In the above driving operation, the dark colored layer 26 blocks light transmitted through the first gap G1. Accordingly, since the barrier 200 transmits light corresponding to the width of the first electrode 14 or the second electrode 16, the left-eye image and the right-eye image may be clearly separated.

Therefore, the electronic display device according to the exemplary embodiment of the present embodiment may prevent a 3D image from being deteriorated by crosstalk.

Since the electronic display device according to the exemplary embodiment of the present embodiment partially blocks the light generated in the display unit 100 of the dark colored layer 26, luminance of a finally realized screen may be deteriorated. However, the dark colored layer 26 does not affect the luminance of the screen since the width of the dark colored layer 26 is only several to tens of microns (µm), and the luminance deterioration may be compensated by increasing luminance of the display unit 100. For example, when a liquid crystal display is formed as the display unit 100, the final luminance of the electronic display device may be maintained at a desired level by increasing luminance of a backlight provided to the liquid crystal display.

In addition, the electronic device according to the exemplary embodiment of the present invention inputs a 2D image signal to the pixels of the display unit 100, and turns off the barrier to realize a 2D image mode.

The electronic display device according to another exemplary embodiment of the present invention will now be described with reference to FIG. 5.

Figure 5:
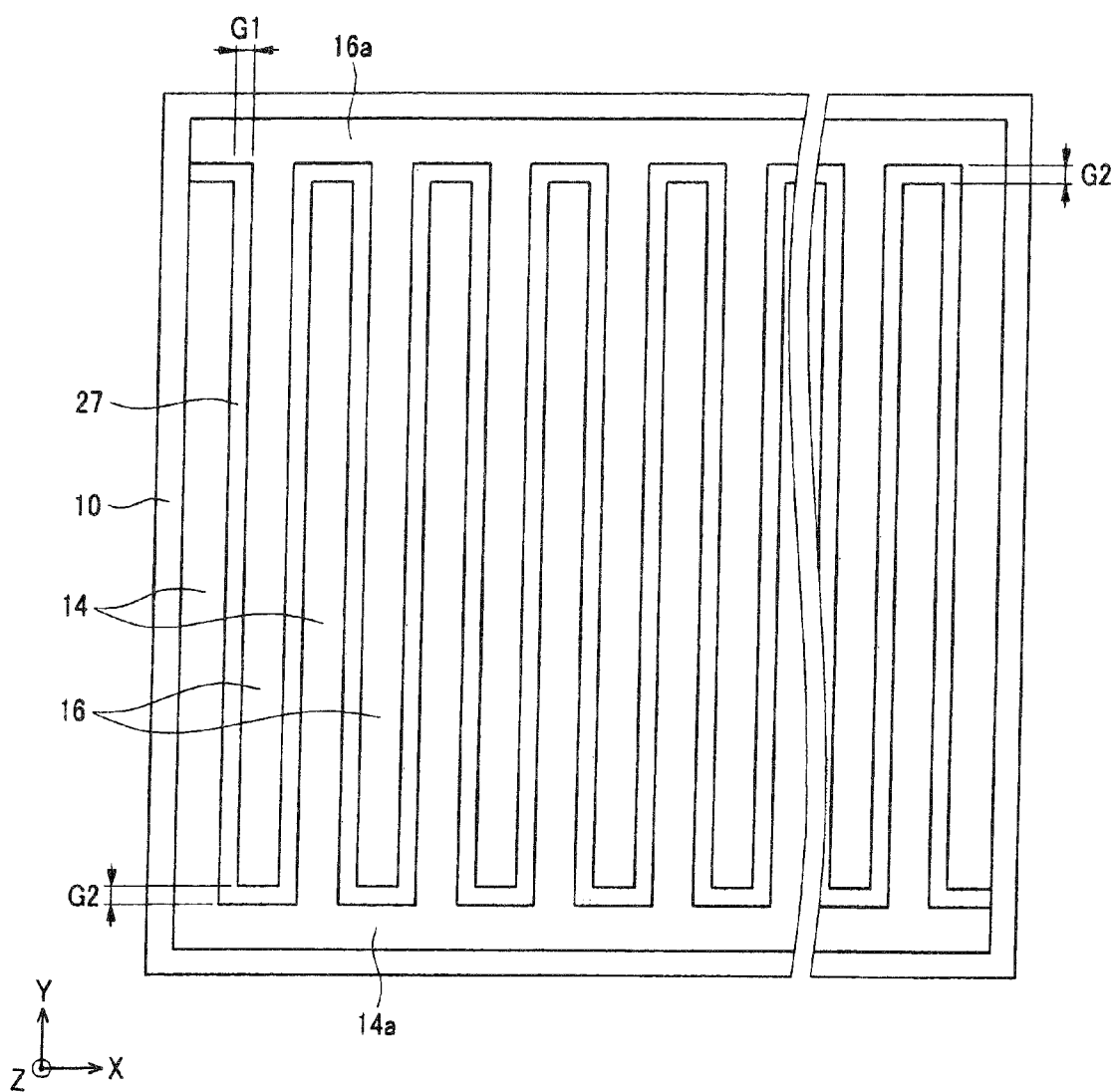
FIG. 5 is a diagram representing the first electrode, the second electrode, and the dark colored layer formed on the first substrate in the electronic display device according to another exemplary embodiment of the present invention.

FIG. 5 is a diagram representing the first electrodes, the second electrodes, and the dark colored layer formed on the first substrate in the electronic display device according to another exemplary embodiment of the present invention. For convenience, like parts of the exemplary embodiments of the present invention are assigned like reference numerals, and detailed descriptions thereof will be omitted.

As shown in FIG. 5, a second gap G2 is formed between the first electrodes 14 and the second connection electrode 16a and between the second electrodes 16 and the first connection electrode 14a. Here, the second gap G2 may communicate with the first gaps G1.

A dark colored layer 27 according to this exemplary embodiment of the present invention is formed to correspond to the first gap G1 and the second gap G2. Here, in a like manner of the above exemplary embodiment of the present invention, the dark colored layer 27 may be formed on the first alignment layer 22 of the first substrate 10, the second alignment layer 24 of the second substrate 12, or both the first alignment layer 22 of the first substrate 10 and the second alignment layer 24 of the second substrate 12.

As described, the dark colored layer 27 is formed to correspond to gaps that may be formed between the first electrodes 14 and the second electrodes 16 and blocks light that may be unnecessarily transmitted from the barrier when driving the electron display device, and therefore the 3d image quality deterioration caused by crosstalk may be efficiently prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electronic display device comprising:
   a display unit for displaying an image; and
   a barrier facing the display unit for converting the image into a two-dimensional image or a three-dimensional image,
   wherein the barrier comprises:
      a first substrate and a second substrate facing each other,
      first electrodes and second electrodes alternating on the first substrate and having first gaps between adjacent first electrodes and second electrodes,
      a third electrode on the second substrate,
      a dark colored layer aligned with the first gaps, and
      a liquid crystal layer between the first substrate and the second substrate.

2. The electronic display device of claim 1, wherein the barrier further comprises:
   a first alignment layer on the first substrate covering the first electrodes and the second electrodes; and
   a second alignment layer on the second substrate covering the third electrode,
   wherein the dark colored layer is on at least one of the first alignment layer and the second alignment layer.

3. The electronic display device of claim 2, wherein the barrier further comprises:
   a first connection electrode for electrically connecting the first electrodes, and
   a second connection electrode for electrically connecting the second electrodes, and
   wherein the dark colored layer is aligned with second gaps between the first connection electrode and the second electrodes and between the second connection electrode and the first electrodes.

4. The electronic display device of claim 2, wherein the dark colored layer is on both the first alignment layer and the second alignment layer.

5. The electronic display device of claim 2, wherein the dark colored layer comprises a first dark layer and a second dark layer.

6. The electronic display device of claim 1, wherein the first electrodes and the second electrodes are transparent, and the third electrode is integrally formed on a front surface of the second substrate.

7. The electronic display device of claim 1, wherein the barrier is a normally white mode liquid crystal display.

8. The electronic display device of claim 7, wherein the barrier is turned off when the display unit displays the two-dimensional image.

9. The electronic display device of claim 1,
   wherein, in the display unit, a first pixel and a second pixel corresponding to a pattern of the first electrodes and second electrodes are alternately and repeatedly arranged along an arrangement direction of the first electrode, wherein a liquid crystal driving voltage is applied to the first electrode, a left-eye image is displayed on the first pixel, and a right-eye image is displayed on the second pixel during a first period, and wherein the liquid crystal driving voltage is applied to the second electrode, the right-eye image is displayed on the first pixel, and the left-eye image is displayed on the second pixel during a second period.

10. The electronic display device of claim 9, wherein the left-eye image and the right-eye image are provided using a time-division driving.

11. The electronic display device of claim 1, wherein a location of the dark colored layer is fixed.

* * * * *